(12) United States Patent
Kim et al.

(10) Patent No.: US 10,640,001 B2
(45) Date of Patent: May 5, 2020

(54) WIRELESS POWER TRANSFER METHOD USING FIELD WINDING AND VEHICLE ASSEMBLY AND ELECTRIC VEHICLE USING THE SAME

(71) Applicants: HYUNDAI MOTOR COMPANY, Seoul (KR); KIA MOTORS CORPORATION, Seoul (KR)

(72) Inventors: Bum Sik Kim, Gwangmyeong-si (KR); Jin Hwan Jung, Suwon-si (KR); Hyeon Uk Kim, Hwaseong-si (KR); Ki Young Jang, Incheon (KR); Gyu Yeong Choe, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 334 days.

(21) Appl. No.: 15/788,456

(22) Filed: Oct. 19, 2017

(65) Prior Publication Data
US 2018/0118040 A1  May 3, 2018

(30) Foreign Application Priority Data
Nov. 1, 2016  (KR) ........................ 10-2016-0144287

(51) Int. Cl.
*H02P 27/08* (2006.01)
*H02J 7/02* (2016.01)
(Continued)

(52) U.S. Cl.
CPC ............. *B60L 11/182* (2013.01); *B60L 50/51* (2019.02); *B60L 53/12* (2019.02); *H02J 7/025* (2013.01);
(Continued)

(58) Field of Classification Search
CPC ........ B60L 11/182; B60L 53/60; B60L 58/10; B60L 53/38; B60L 53/53; B60L 50/51; B60L 53/12; B60L 2210/40; H02J 50/10; H02J 7/025; H02J 50/90; H02P 27/08; H02P 6/32; Y02T 10/7022; Y02T 10/7241; Y02T 90/14; Y02T 10/642; Y02T 90/16; Y02T 10/7005; Y02T 90/122; H02M 3/33569; G01R 19/165; B60Y 2200/91
See application file for complete search history.

(56) References Cited

U.S. PATENT DOCUMENTS

| | | | |
|---|---|---|---|
| 9,969,280 B2 * | 5/2018 | Maikawa | H02J 7/025 |
| 2012/0007551 A1 * | 1/2012 | Song | B60L 53/00 320/109 |

(Continued)

*Primary Examiner* — Jared Fureman
*Assistant Examiner* — Michael J Warmflash
(74) *Attorney, Agent, or Firm* — Morgan, Lewis & Bockius LLP

(57) ABSTRACT

A wireless power transfer (WPT) method for an electric vehicle (EV) may include a vehicle controller or a vehicle assembly (VA) controller connected to the vehicle controller performing communications, for charging of a battery of the EV, with a ground assembly (GA) controller of a charger connected to a primary coil or a primary pad located outside the EV; and connecting the battery to a field winding of a driving motor of the EV before starting the WPT. The battery is charged by a power magnetically induced at the field winding from the primary coil.

18 Claims, 7 Drawing Sheets

(51) Int. Cl.
  *B60L 11/18* (2006.01)
  *H02J 50/10* (2016.01)
  *B60L 50/51* (2019.01)
  *B60L 53/12* (2019.01)
  *H02P 6/32* (2016.01)
  *H02M 3/335* (2006.01)

(52) U.S. Cl.
  CPC ............ *H02J 50/10* (2016.02); *H02P 27/08* (2013.01); *B60L 2210/40* (2013.01); *H02M 3/33569* (2013.01); *H02P 6/32* (2016.02); *Y02T 10/642* (2013.01); *Y02T 10/7005* (2013.01); *Y02T 10/7022* (2013.01); *Y02T 10/7241* (2013.01); *Y02T 90/122* (2013.01); *Y02T 90/14* (2013.01); *Y02T 90/16* (2013.01)

(56) References Cited

U.S. PATENT DOCUMENTS

| | | | |
|---|---|---|---|
| 2013/0187453 A1* | 7/2013 | Flett | H05K 7/20509 307/23 |
| 2013/0293163 A1* | 11/2013 | Flett | H02P 27/08 318/139 |
| 2014/0225434 A1* | 8/2014 | Niizuma | B66F 7/28 307/10.1 |
| 2014/0257614 A1* | 9/2014 | Niizuma | B60L 53/30 701/22 |
| 2015/0077156 A1* | 3/2015 | Kim | G01D 5/24457 324/765.01 |
| 2016/0243955 A1* | 8/2016 | Yoshida | B62D 15/028 |

* cited by examiner

WIRELESS POWER TRANSFER METHOD USING FIELD WINDING AND VEHICLE ASSEMBLY AND ELECTRIC VEHICLE USING THE SAME

CROSS-REFERENCE TO RELATED APPLICATION

This application claims the benefit of priority to Korean Patent Application No. 2016-0144287 filed on Nov. 1, 2016 with the Korean Intellectual Property Office (KIPO), the entire contents of which are hereby incorporated by reference as if fully set forth herein.

TECHNICAL FIELD

The present disclosure relates generally to a wireless power transfer (WPT) system, and a vehicle assembly (VA) and an electric vehicle (EV) using the same, and more particularly, to a WPT method for receiving a wireless power by using a field winding of a driving motor of an EV.

BACKGROUND

An electric vehicle (EV) charging system may be defined as a system for charging a battery of an EV by using power of a commercial power grid or an energy storage system. Such an EV charging system may have various forms according to types of EVs. For example, an EV charging system may be a conductive type system using a charging cable or a non-contact wireless power transfer (WPT) type system (also referred to as an 'inductive type').

In the case of the inductive type charging using a WPT system, when a high-voltage battery mounted on the EV is to be charged, the EV maybe positioned to a ground assembly (GA) located in a charging station or a charging spot capable of EV charging.

When charging the EV, a vehicle assembly (VA) (i.e., a reception pad in the VA) mounted on the EV makes an inductive resonance coupling with a transmission pad of the GA located in the charging station or the charging spot, and charges the battery in the EV using power transferred from the GA through the inductive resonance coupling.

Moreover, the reception pad (i.e., a secondary pad) installed in the EV is limited in size, weight and arrangement position when it is mounted on the EV. Also, considering the efficiency of WPT, it may be installed usually in a position as close as possible to the transmission pad (i.e. a primary pad), so that the degree of freedom in installation of other parts of the EV is limited. Therefore, in the design of the EV, the secondary pad may have a bad influence on the degree of freedom such as placement of parts.

SUMMARY

Accordingly, embodiments of the present disclosure are provided to substantially obviate one or more problems due to limitations and disadvantages of the related art.

Embodiments of the present disclosure provide a WPT method capable of omitting a secondary pad and receiving wireless power from a primary coil on a ground side using a field winding of a driving motor mounted on an EV.

Embodiments of the present disclosure also provide a VA assembly capable of receiving wireless power from a primary pad on a ground side using a field winding of a driving motor mounted on an EV.

Embodiments of the present disclosure also provide an EV capable of receiving wireless power from a primary pad on a ground side using a field winding of a driving motor mounted on the EV.

According to embodiments of the present disclosure, a wireless power transfer (WPT) method for an electric vehicle may include a vehicle controller or a vehicle assembly (VA) controller connected to the vehicle controller performing communications, for charging of a battery of the EV, with a ground assembly (GA) controller of a charger connected to a primary coil or a primary pad located outside the EV; and connecting the battery to a field winding of a driving motor of the EV before starting the WPT. The battery may be charged by a power magnetically induced at the field winding from the primary coil.

The connecting may include turning on a first switch between the field winding of the driving motor and the inverter, and turning on a second switch between the field winding of the driving motor and the battery.

The field winding may include a first field winding facing the primary coil and a second field winding facing the primary coil with the first field winding interposed between the primary coil and the second field winding coil.

The WPT method may further comprise, after the connecting, sensing a voltage or current by a magnetic field induced at the field winding; determining whether a physical quantity is equal to or greater than a first reference value, the physical quantity including or being based on the voltage or the current; rotating a rotor of the driving motor wound on which the field winding is wound within a predetermined angle range in response to the determination that the physical quantity is not equal to or greater than the first reference value; and determining a position where the physical quantity is largest within the predetermined angle range as a charging position of the rotor.

The WPT method may further comprise, after the determining, transmitting a signal requesting to control a position of the primary coil to the GA controller controlling the primary coil when the physical quantity is not equal to or greater than the first reference value.

The WPT method may further comprise, after the determining, transmitting a control signal for controlling a position of the primary coil to an externally-controllable actuator connected to the primary coil.

In accordance with embodiments of the present disclosure, a vehicle assembly (VA) for wireless power transfer (WPT) includes a secondary coil magnetically coupled to a primary coil located outside an electric vehicle (EV); an impedance matching network (IMN) or a filter connected to the secondary coil; a rectifier connected to the IMN or the filter; and an impedance converter connected to the rectifier, wherein the secondary coil includes a field winding of a driving motor of the EV.

The VA may further comprise a mode change switch connected between the field winding and the IMN or the filter; and a charge switch disposed between a battery of the EV and the impedance converter.

The VA may further comprise a controller mounted on the EV. Also, the controller may be connected to or includes at least one of a control board configured to control an inverter connected to the driving motor with three-phase wiring, a vehicle assembly (VA) controller, and a vehicle controller. The controller is configured to turn off switches in the inverter connected to the driving motor via the control board, and to control the mode change switch and the charge switch to connect the field winding to the battery.

The controller may change a position or a phase angle of a rotor of the driving motor on which the field winding is wound based on a physical quantity, the physical quantity including or being based on a voltage or a current induced at the field winding by the primary coil.

The field winding may be regularly or symmetrically arranged in a lap winding structure only on a part of a surface of the rotor.

The conversion circuit may include the IMN or the filter, the rectifier, and the impedance converter may be housed in a housing for accommodating an inverter connected to the driving motor through three-phase wiring and a control board configured to control the inverter.

In accordance with embodiments of the present disclosure, an electric vehicle (EV) includes a driving motor; an inverter connected to the driving motor; a control board configured to control a plurality of switches of the inverter; a battery connected to a field winding of the driving motor; and a charge switch disposed between the field winding of the driving motor and the battery to allow or block current flow on the field winding. A current induced at the field winding by a magnetic field from an external primary coil is charged to the battery when the charge switch is turned on.

The EV may further comprise a connector assembly connected to the charge switch and electrically coupled to a pair of electrodes on which a pair of ends of the field winding are exposed.

The EV may further comprise a secondary side conversion circuit arranged between the charge switch and the connector assembly.

The control board may include a sensing circuit for detecting a secondary current or a secondary voltage induced at the field winding, and the control board is configured to a control signal for blocking a power transmission line between the battery and the charge switch based on a current voltage of the battery and one of the secondary current and the secondary voltage.

The control board may be configured to control a position of the rotor sensed based on the secondary current or the secondary voltage.

The driving motor may be disposed below an engine compartment of the EV.

Using the WPT method and the VA according to embodiments of the present disclosure, the secondary pad in which the secondary coil of the WPT system is built may be omitted, and it may be possible to receive wireless power from the primary coil on the ground side by using the field winding of the driving motor in the EV, thereby increasing the degree of freedom in designing the EV and arranging parts in the structure in which the secondary pad is omitted.

Also, by omitting the secondary pad mounted on the EV, it may be possible to reduce the cost for parts, installation, maintenance and the like of the secondary pad, and to reduce the burden of mounting the WPT system in the production of the EV.

BRIEF DESCRIPTION OF DRAWINGS

Embodiments of the present disclosure will become more apparent by describing in detail embodiments of the present disclosure with reference to the accompanying drawings, in which.

Figure 1:
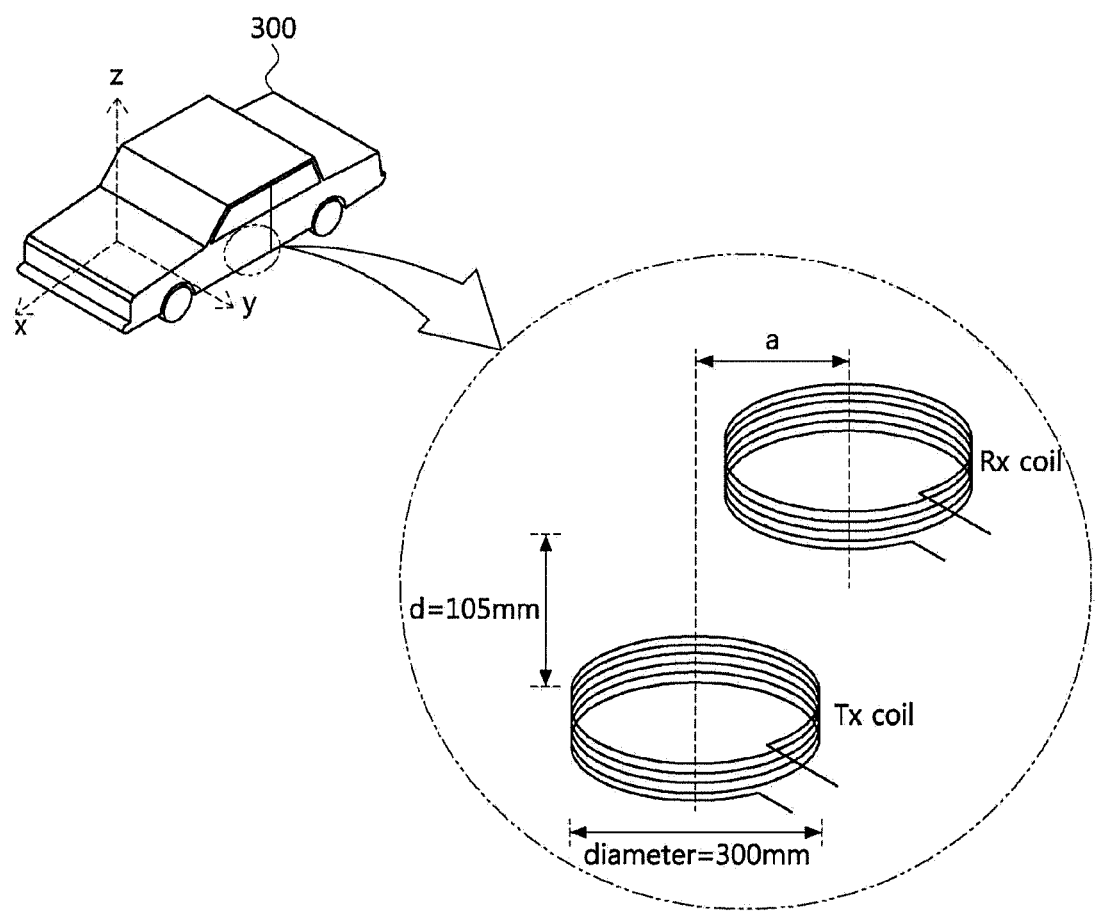
FIG. 1 is a conceptual diagram illustrating an alignment between a primary coil and a secondary coil in an EV to which a WPT method according to an embodiment of the present disclosure is applied.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment

DETAILED DESCRIPTION

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein. While describing the respective drawings, like reference numerals designate like elements.

It will be understood that although the terms "first," "second," etc. may be used herein to describe various components, these components should not be limited by these terms. These terms are used merely to distinguish one element from another. For example, without departing from the scope of the present disclosure, a first component may be designated as a second component, and similarly, the second component may be designated as the first component. The term "and/or" include any and all combinations of one of the associated listed items.

It will be understood that when a component is referred to as being "connected to" another component, it can be directly or indirectly connected to the other component. That is, for example, intervening components may be present. On the contrary, when a component is referred to as being "directly connected to" another component, it will be understood that there is no intervening components.

Terms are used herein only to describe the embodiments but not to limit the present disclosure. Singular expressions, unless defined otherwise in contexts, include plural expressions. In the present specification, terms of "comprise" or "have" are used to designate features, numbers, steps, operations, elements, components or combinations thereof disclosed in the specification as being present but not to exclude possibility of the existence or the addition of one or more other features, numbers, steps, operations, elements, components, or combinations thereof.

All terms including technical or scientific terms, unless being defined otherwise, have the same meaning generally understood by a person of ordinary skill in the art. It will be understood that terms defined in dictionaries generally used are interpreted as including meanings identical to contextual meanings of the related art, unless definitely defined otherwise in the present specification, are not interpreted as being ideal or excessively formal meanings.

Terms used in the present disclosure are defined as follows.

"Electric Vehicle, EV": An automobile, as defined in 49 CFR 523.3, intended for highway use, powered by an electric motor that draws current from an on-vehicle energy storage device, such as a battery, which is rechargeable from an off-vehicle source, such as residential or public electric service or an on-vehicle fuel powered generator. The EV may be four or more wheeled vehicle manufactured for use primarily on public streets, roads.

The EV may be referred to as an electric car, an electric automobile, an electric road vehicle (ERV), a plug-in vehicle (PV), a plug-in vehicle (xEV), etc., and the xEV may be classified into a plug-in all-electric vehicle (BEV), a battery electric vehicle, a plug-in electric vehicle (PEV), a hybrid electric vehicle (HEV), a hybrid plug-in electric vehicle (HPEV), a plug-in hybrid electric vehicle (PHEV), etc.

"Plug-in Electric Vehicle, PEV": An Electric Vehicle that recharges the on-vehicle primary battery by connecting to the power grid.

"Plug-in vehicle, PV": An electric vehicle rechargeable through wireless charging from an electric vehicle supply equipment (EVSE) without using a physical plug or a physical socket.

"Heavy duty vehicle; H.D. Vehicle": Any four-or more wheeled vehicle as defined in 49 CFR 523.6 or 49 CFR 37.3 (bus).

"Light duty plug-in electric vehicle": A three or four-wheeled vehicle propelled by an electric motor drawing current from a rechargeable storage battery or other energy devices for use primarily on public streets, roads and highways and rated at less than 4,545 kg gross vehicle weight.

"Wireless power charging system, WCS": The system for wireless power transfer and control between the GA and VA including alignment and communications. This system transfers energy from the electric supply network to the electric vehicle electromagnetically through a two-part loosely coupled transformer.

"Wireless power transfer, WPT": The transfer of electrical power from the AC supply network to the electric vehicle by contactless means.

"Utility": A set of systems which supply electrical energy and may include a customer information system (CIS), an advanced metering infrastructure (AMI), rates and revenue system, etc. The utility may provide the EV with energy through rates table and discrete events. Also, the utility may provide information about certification on EVs, interval of power consumption measurements, and tariff.

"Smart charging": A system in which EVSE and/or PEV communicate with power grid in order to optimize charging ratio or discharging ratio of EV by reflecting capacity of the power grid or expense of use.

"Automatic charging": A procedure in which inductive charging is automatically performed after a vehicle is located in a proper position corresponding to a primary charger assembly that can transfer power. The automatic charging may be performed after obtaining necessary authentication and right.

"Interoperability": A state in which components of a system interwork with corresponding components of the system in order to perform operations aimed by the system. Also, information interoperability may mean capability that two or more networks, systems, devices, applications, or components can efficiently share and easily use information without causing inconvenience to users.

"Inductive charging system": A system transferring energy from a power source to an EV through a two-part gapped core transformer in which the two halves of the transformer, primary and secondary coils, are physically separated from one another. In the present disclosure, the inductive charging system may correspond to an EV power transfer system.

"Inductive coupler": The transformer formed by the coil in the GA Coil and the coil in the VA Coil that allows power to be transferred with galvanic isolation.

"Inductive coupling": Magnetic coupling between two coils. In the present disclosure, coupling between the GA Coil and the VA Coil.

"Ground assembly, GA'": An assembly on the infrastructure side consisting of the GA Coil, a power/frequency conversion unit and GA controller as well as the wiring from the grid and between each unit, filtering circuits, housing(s) etc., necessary to function as the power source of wireless power charging system. The GA may include the communication elements necessary for communication between the GA and the VA.

"Vehicle assembly, VA": An assembly on the vehicle consisting of the VA Coil, rectifier/power conversion unit and VA controller as well as the wiring to the vehicle batteries and between each unit, filtering circuits, housing(s), etc., necessary to function as the vehicle part of a wireless power charging system. The VA may include the communication elements necessary for communication between the VA and the GA.

The GA may be referred to as a primary device (PD), and the VA may be referred to as a secondary device (SD).

"Primary device": An apparatus which provides the contactless coupling to the secondary device. That is, the primary device may be an apparatus external to an EV. When the EV is receiving power, the primary device may act as the source of the power to be transferred. The primary device may include the housing and all covers.

"Secondary device": An apparatus mounted on the EV which provides the contactless coupling to the primary device. That is, the secondary device may be installed in the EV. When the EV is receiving power, the secondary device may transfer the power from the primary to the EV. The secondary device may include the housing and all covers.

"GA controller": The portion of the GA which regulates the output power level to the GA Coil based on information from the vehicle.

"VA controller": The portion of the VA that monitors specific on-vehicle parameters during charging and initiates communication with the GA to control output power level.

The GA controller may be referred to as a primary device communication controller (PDCC), and the VA controller may be referred to as an electric vehicle communication controller (EVCC).

"Magnetic gap": The vertical distance between the plane of the higher of the top of the litz wire or the top of the magnetic material in the GA Coil to the plane of the lower of the bottom of the litz wire or the magnetic material in the VA Coil when aligned.

"Ambient temperature": The ground-level temperature of the air measured at the subsystem under consideration and not in direct sun light.

"Vehicle ground clearance": The vertical distance between the ground surface and the lowest part of the vehicle floor pan.

"Vehicle magnetic ground clearance": The vertical distance between the plane of the lower of the bottom of the litz wire or the magnetic material in the VA Coil mounted on a vehicle to the ground surface.

"VA Coil magnetic surface distance": the distance between the plane of the nearest magnetic or conducting component surface to the lower exterior surface of the VA coil when mounted. This distance includes any protective coverings and additional items that may be packaged in the VA Coil enclosure.

The VA coil may be referred to as a secondary coil, a vehicle coil, or a receive coil. Similarly, the GA coil may be referred to as a primary coil, or a transmit coil.

"Exposed conductive component": A conductive component of electrical equipment (e.g. an electric vehicle) that may be touched and which is not normally energized but which may become energized in case of a fault.

"Hazardous live component": A live component, which under certain conditions can give a harmful electric shock.

"Live component": Any conductor or conductive component intended to be electrically energized in normal use.

"Direct contact": Contact of persons with live components. (See IEC 61440)

"Indirect contact": Contact of persons with exposed, conductive, and energized components made live by an insulation failure. (See IEC 61140)

"Alignment": A process of finding the relative position of primary device to secondary device and/or finding the relative position of secondary device to primary device for the efficient power transfer that is specified. In the present disclosure, the alignment may direct to a fine positioning of the wireless power transfer system.

"Pairing": A process by which a vehicle is correlated with the unique dedicated primary device, at which it is located and from which the power will be transferred. Pairing may include the process by which a VA controller and a GA controller of a charging spot are correlated. The correlation/association process may include the process of establishment of a relationship between two peer communication entities.

"Command and control communication": The communication between the EV supply equipment and the EV exchanges information necessary to start, control and terminate the process of WPT.

"High level communication (HLC)": HLC is a special kind of digital communication. HLC is necessary for additional services which are not covered by command & control communication. The data link of the HLC may use a power line communication (PLC), but it is not limited.

"Low power excitation (LPE)": LPE means a technique of activating the primary device for the fine positioning and pairing so that the EV can detect the primary device, and vice versa.

"Service set identifier (SSID)": SSID is a unique identifier consisting of 32-characters attached to a header of a packet transmitted on a wireless LAN. The SSID identifies the basic service set (BSS) to which the wireless device attempts to connect. The SSID distinguishes multiple wireless LANs. Therefore, all access points (APs) and all terminal/station devices that want to use a specific wireless LAN can use the same SSID. Devices that do not use a unique SSID are not able to join the BSS. Since the SSID is shown as plain text, it may not provide any security features to the network.

"Extended service set identifier (ESSID)": ESSID is the name of the network to which one desires to connect. It is similar to SSID but can be a more extended concept.

"Basic service set identifier (BSSID)": BSSID consisting of 48 bits is used to distinguish a specific BSS. In the case of an infrastructure BSS network, the BSSID may be medium access control (MAC) of the AP equipment. For an independent BSS or ad hoc network, the BSSID can be generated with any value.

The charging station may comprise at least one GA and at least one GA controller configured to manage the at least one GA. The GA may comprise at least one wireless communication device. The charging station may mean a place having at least one GA, which is installed in home, office, public place, road, parking area, etc.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

In embodiments according to the present disclosure, a light load driving or light load operation may include, for example, charging a high voltage battery with a charging voltage lower than a predetermined rated voltage in the latter half of charging for the high voltage battery connected to the VA in the WPT system. Also, the light load operation may include a case in which the high-voltage battery of EV is charged at a relatively low voltage and at a low speed by using a low-speed charger such as a household charger.

Hereinafter, embodiments according to the present disclosure will be explained in detail by referring to accompanying figures.

FIG. 1 is a conceptual diagram for an alignment between a primary coil and a secondary coil in an EV to which a WPT method according to an embodiment of the present disclosure is applied.

Referring to FIG. 1, an electric vehicle (EV) 300 according to an embodiment uses a wireless power transfer (WPT) method described elsewhere herein or may use a vehicle assembly (VA) for the same. Also, the EV 300 has a secondary coil (i.e., 'Rx coil' in FIG. 1) for charging a battery (i.e., a high-voltage battery or a traction battery) of the EV 300.

In an embodiment, the secondary coil mounted on the EV 300 may not have a form embedded in the conventional secondary pad. That is, the secondary coil of the EV 300 may be, for example, a field winding of a driving motor which rotates wheels of the EV 300 by the electric power of the battery.

The secondary coil of the EV 300 is aligned with the primary coil for receiving wireless power from a primary coil (i.e., 'Tx coil' in FIG. 1) in a magnetic induction manner or a magnetic induction resonance manner.

For example, as depicted in FIG. 1, when the primary coil and secondary coil are circular ring-shaped, each having a diameter of 300 millimeters (mm) and spaced apart by a vertical distance 'd' of, for example, about 105 mm and arranged in parallel with each other, a coupling coefficient or a power transfer efficiency varies greatly according to the interval 'a' between center lines of the primary and secondary coils.

Therefore, in the case of WPT, it is desirable to align the secondary coil with the primary coil for increasing the efficiency of the WPT.

Figure 2:
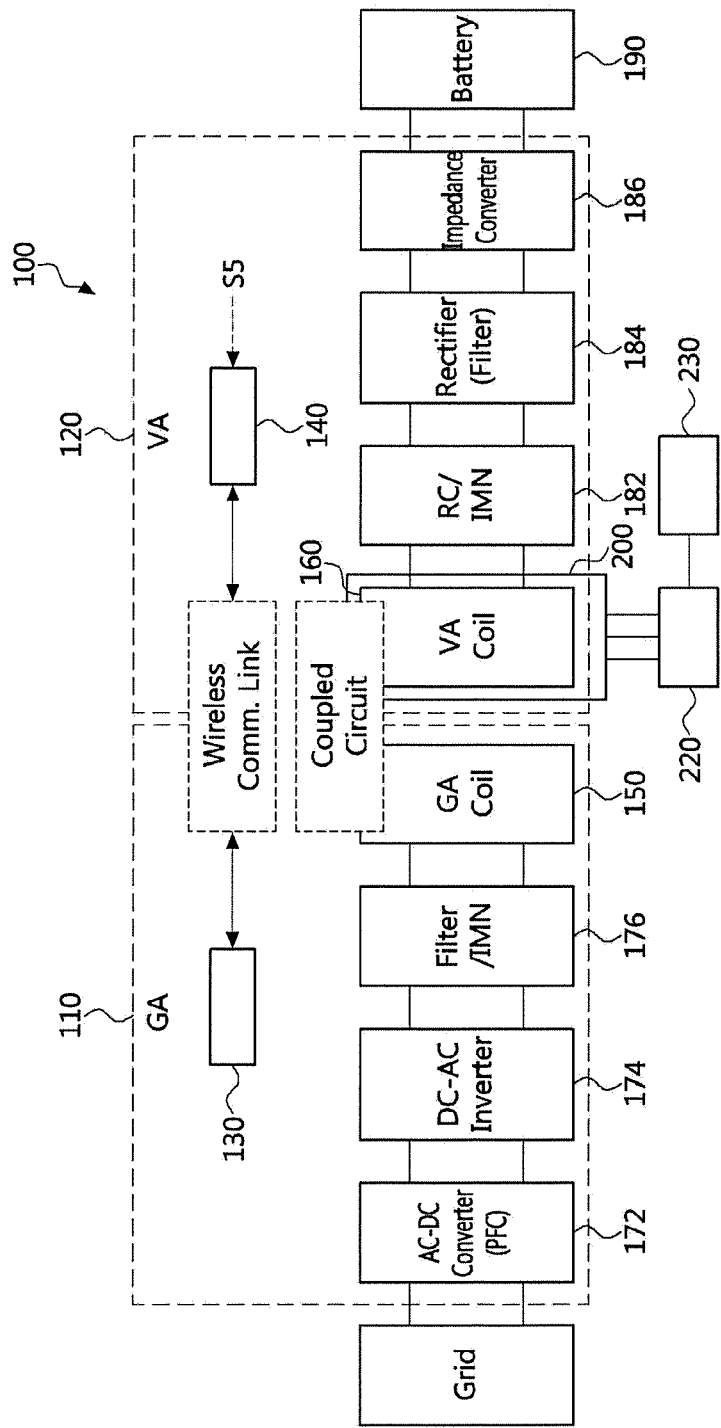
FIG. 2 is a schematic block diagram illustrating a WPT system capable of employing a WPT method, according to an embodiment of the present disclosure.

FIG. 2 is a schematic block diagram illustrating a WPT system capable of employing a WPT method, according to an embodiment of the present disclosure.

Referring to FIG. 2, a WPT system 100 comprises a ground assembly (GA) 110 and a vehicle assembly (VA) 120. The WPT system 100 is connected to a driving motor 200 providing a secondary coil (i.e., a VA coil) 160. The driving motor 200 is connected to an inverter 220 configured to control the driving motor 200. The inverter 220 is further connected to a control board 230 configured to control operations of the inverter 220 and further configured to control a WPT using a field winding (not explicitly shown) of the driving motor 200. That is, in the embodiment depicted in FIG. 2, the field winding of the driving motor 200 acts as a secondary coil for the WPT.

The components of the WPT system 100 are described in further detail as follows.

First, the GA 110 includes an alternating current to direct current (AC-DC) converter 172 having a power factor correction (PFC) function connected to a grid, a direct current to alternating current (DC-AC) inverter 174, a filter/impedance matching network (IMN) 176, and a GA coil (also referred to as 'primary coil') 150. The GA 110 further includes a GA controller 130. Depending on the implementation, the GA 110 may further include a DC-DC converter described elsewhere herein, a resonance circuit (RC), and the like.

The VA 120 includes a VA coil (also referred to as 'secondary coil') 160 forming a magnetic coupled circuit with the GA coil 150, a RC/IMN 182, a rectifier 184 having a filter function, and an impedance converter 186. The impedance converter 186 is coupled to the vehicle's high voltage battery 190. The VA 120 further includes a VA controller 140. The VA controller 140 may be connected to an electronic control unit (ECU) (not explicitly shown) of the EV, and receive a predetermined control signal S5 from the ECU.

When performing the WPT, the VA controller 140 may perform command and control (C&C) communications and high-level communications (HLC) with the GA controller 130 via a wireless communication link.

The driving motor 200, the inverter 220, and the control board 230 will be described later with reference to embodiments of the present disclosure.

A flow of the WPT is described with reference to FIG. 2, as follows.

A current to be charged to the battery is determined at the VA 120. A power request is then transferred from the VA 120 (i.e., the VA controller 140) to the GA 110 (i.e., the GA controller 130) via the wireless communication link.

The GA 110 recognizes the power request from the VA 120, convert power supplied from the grid to a high frequency AC through the AC-DC converter 172 and the DC-AC inverter 174, and transfer the high frequency AC to the GA coil 150.

A high frequency AC is then induced at the VA coil 160 through magnetic coupling between the GA coil 150 to the VA coil 160, rectified and converted in the VA 120, and finally used for charging the battery 190.

The above-described procedure continues until the battery 190 is fully charged and the VA 120 transmits a signal indicating completion of charging to the GA 110.

Figure 3:
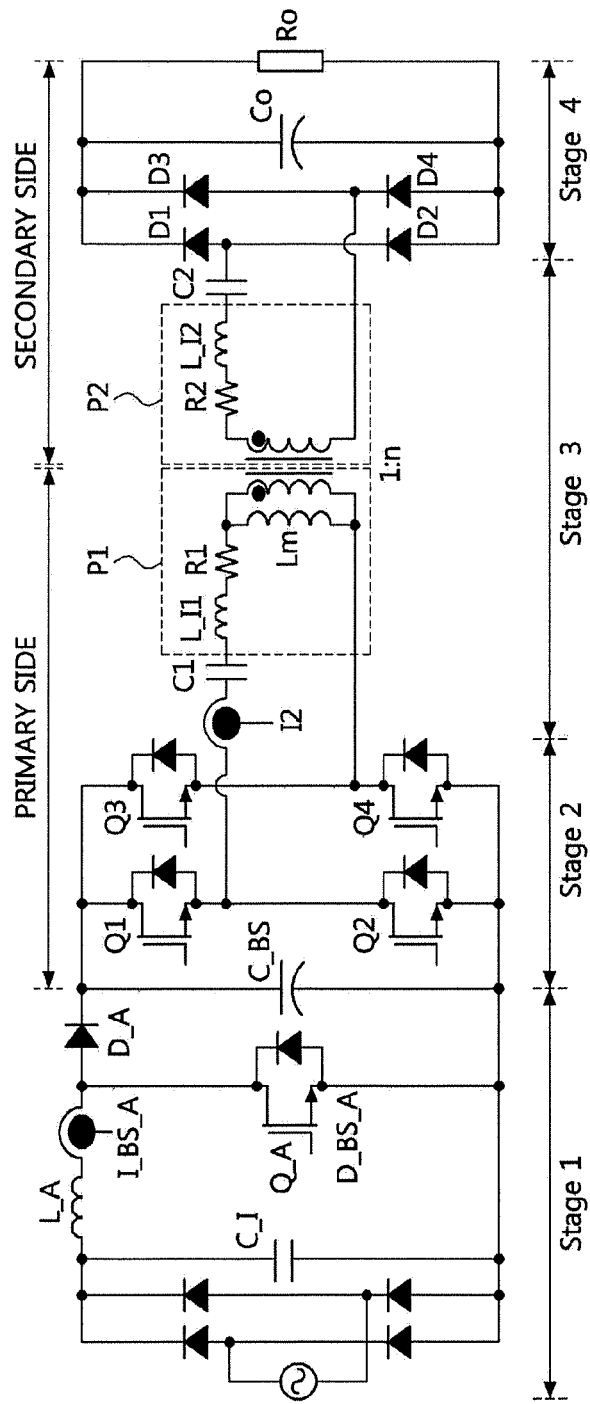
FIG. 3 is an illustrative circuit diagram explaining an operation principle of the WPT system of FIG. 2.

FIG. 3 is an illustrative circuit diagram explaining an operation principle of the WPT system of FIG. 2.

Referring to FIG. 3, the operation of the WPT system according to an embodiment may be divided into a PFC stage (referred to as 'Stage 1'), a primary stage of a resonance-type DC-DC converter (simply referred to as 'DC-DC primary stage' or 'Stage 2'), a stage of pads and resonance capacitors (referred to as 'Stage 3'), and an output rectification stage (referred to as 'Stage 4').

The PFC stage is a circuit for correcting the power factor of an AC power source voltage, and includes a bridge rectifier connected to the grid, an input capacitor C_I connected in parallel to output ends of the bridge rectifier, a smoothing switch Q_A connected in parallel to the input capacitor C_I, an input inductor L_A disposed between one end (high potential side) of the input capacitor C_I and one end of the smoothing switch Q_A, and an input diode D_A connected to one end of the smoothing switch Q_A. In the Stage 1, a predetermined control signal may be input to a control terminal of the smoothing switch Q_A, and a current sensor may be disposed at one end of the input inductor L_A.

In an embodiment, the PFC stage may be configured to convert the AC power source voltage to a DC voltage and correct the power factor in a form of a step-up converter, but its configuration is not limited to the form of the step-up converter.

In the DC-DC primary stage, a level of the DC voltage is changed so that the DC voltage can charge the battery. In an embodiment, the DC voltage is converted to AC in a form of a voltage, and then converted to DC through a rectifier. The DC-DC converter is divided into a primary side and a secondary side with respect to the pads P1 and P2, and a resonance network is formed with passive elements in the primary side and the secondary side in order to transfer maximum power from the primary side to the secondary side.

In an embodiment, the DC-DC primary stage includes a smoothing capacitor C_BS connected in parallel to the output stage of the PFC stage, and a bridge circuit connected in parallel to the smoothing capacitor C_BS. The bridge circuit transfers power to the primary pad P1 side by four power switches $Q_1$, $Q_2$, $Q_3$, and $Q_4$. The power switches substantially transfer power from the transmitting side to the receiving side. Power elements such as metal oxide semiconductor field effect transistors (MOSFET) may be used as the power switches.

The stage of pads and resonance capacitors include a primary coil and a series circuit of a first capacitor C1, a first inductor L_I1 and a first resistor R1 coupled to the primary coil. This series circuit may be referred to as a primary resonance network. A current sensor may be disposed at one end of an input side of the first capacitor C1. The current sensor may be configured to measure AC of the converter for use in charging control. Further, a coil inductor Lm for mutual inductance is connected in parallel at both ends of the primary coil. The first inductor L_I1, the first resistor R1, the coil inductor Lm, and the primary coil may be integrally included in the primary pad P1. The primary pad P1 may further include a casing or a housing.

In the stage of pads and resonance capacitors, the secondary pad P2 includes a secondary coil and a series circuit of a second resistor R2, a second inductor L_I2, and a second capacitor C2 which are connected to the secondary coil. This series circuit may be referred to as a secondary resonance network. The second capacitor C2 takes charge of resonance in the secondary side. The secondary coil, the second resistor R2, and the second inductor L_I2 may be integrally included in the driving motor corresponding to the secondary pad P2. As described above, in an embodiment, the field winding of the driving motor is used as the secondary coil.

The output rectification stage includes a rectifier circuit connected to the output ends of the stage of pads and resonance capacitors to receive a current alternately outputted from the high potential side and the low potential side of the Stage 3 and output to the load Ro side. The rectifier circuit includes first to fourth diodes D1, D2, D3, and D4 for converting the AC voltage to a DC voltage in a full bridge rectification manner.

The output rectification stage further includes an output capacitor Co connected in parallel between the rectifier circuit and the load Ro.

In the configuration described above, the DC-DC primary stage (i.e., Stage 2) and the stage of pads and resonance capacitors (i.e., Stage 3) may be referred to as the transmitting side in the WPT, and the other part of the Stage 3 and the output rectification stage (i.e., Stage 4) may be referred to as the receiving side in the WPT.

Figure 4:
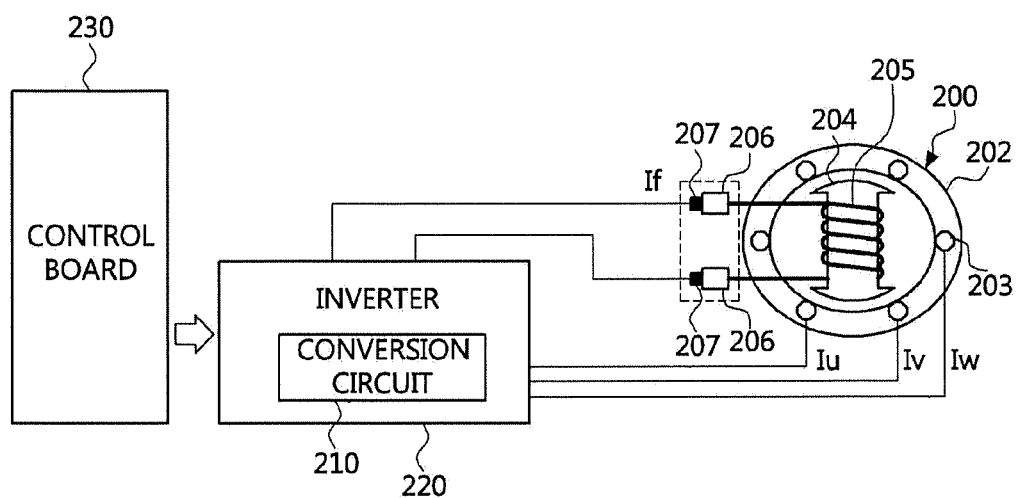
FIG. 4 is a schematic diagram explaining a principle of WPT by field windings of a driving motor of an EV in the WPT system of FIG. 2.

FIG. 4 is a schematic diagram explaining a principle of WPT by field windings of a driving motor of an EV in the WPT system of FIG. 2.

Referring to FIG. 4, the driving motor 200 of the EV according to an embodiment includes a stator 202, at least one stator winding 203 disposed in the stator 202, a rotor 204, and a field winding 205 disposed in the rotor. The rotor 204 may be formed of an electromagnet. Both ends of the field winding 205 may be exposed to the outside of the driving motor 200. Terminals 206 are coupled to both ends of the field winding 205.

The driving motor 200 is connected to an inverter 220. The rotor 204 rotates according to three-phase (Iu, Iv, Iw) power sources of the inverter 220, which are sequentially applied to a plurality of stator windings, to generate a driving force. The electric power of the inverter 220 and the driving motor 200 may be supplied from the battery of the EV.

The inverter 220 includes a conversion circuit 210. Depending on the implementation, the conversion circuit 210 may be externally coupled to the inverter 220. In FIG. 4, the conversion circuit 210 may be viewed as being disposed within a casing or housing of the inverter 220. The conversion circuit 210 may include a circuit for rectifying the voltage generated in the field winding.

The both ends of the field winding 205 are connected to the inverter 220 or the conversion circuit 210. A pair of connectors 207 connected to the conversion circuit 210 are detachably connected to the both terminals 206 of the field winding 205.

The inverter 220 may further include a control board 230. In an embodiment, the control board 230 may have a processor and may be configured to control ON/OFF operations of the conversion circuit 210 while controlling the operation of the inverter 220. Depending on the implementation, the control board 230 may be installed as at least a part of a separate controller or a controller located outside the inverter 220.

Figure 5:
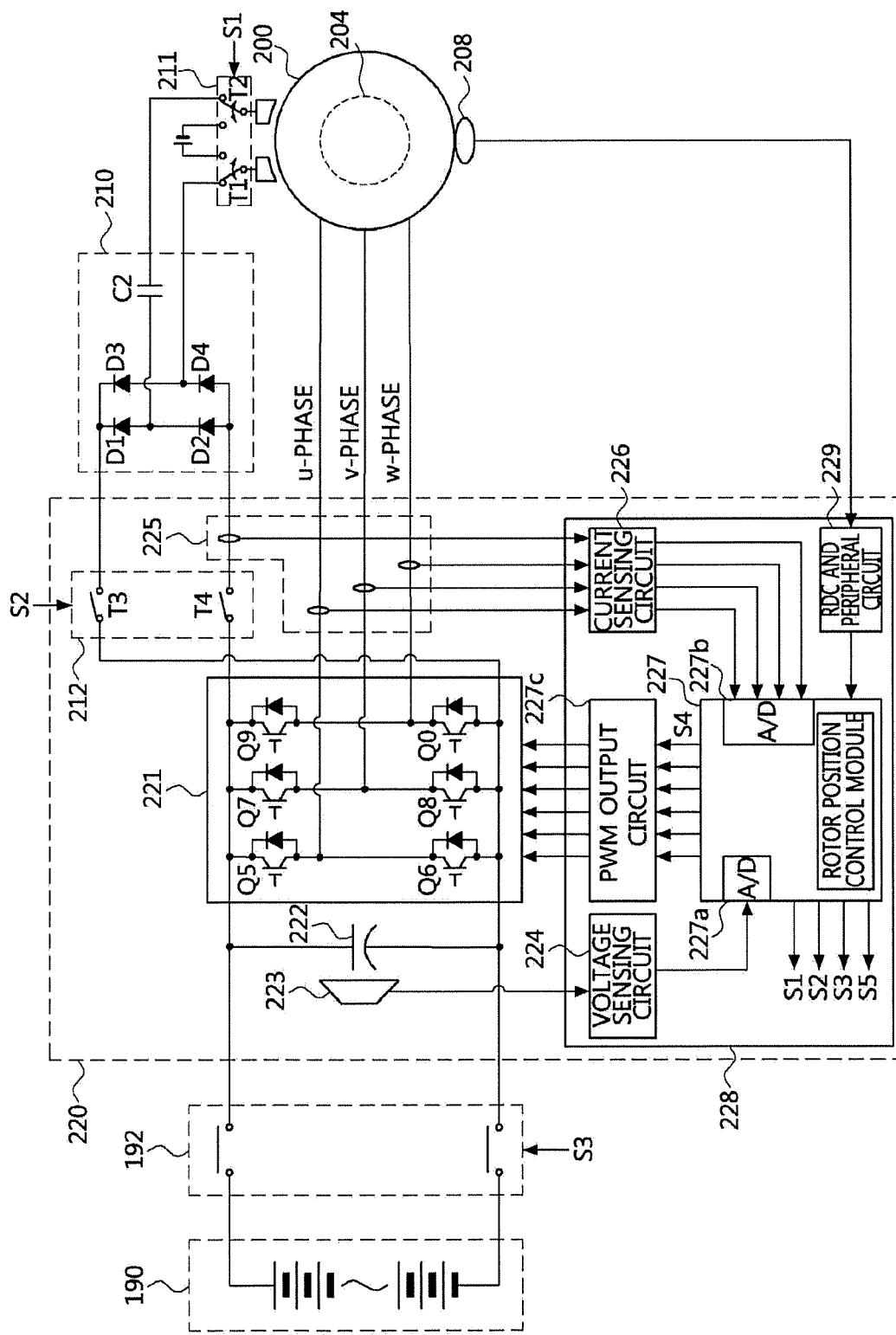
FIG. 5 is an illustrative diagram depicting an implementation circuit of a WPT method employed in the WPT system of FIG. 2.

FIG. 5 is an illustrative diagram depicting an implementation circuit of a WPT method employed in the WPT system of FIG. 2.

Referring to FIG. 5, the inverter 220 according to an embodiment includes a power module 221, a DC capacitor 222, a DC voltage sensor 223, a DC voltage sensing circuit 224, at least one current sensor 225, a current sensing circuit 226, a central processing unit 227, and a resolver digital converter (RDC) and peripheral circuitry 229.

The DC voltage sensing circuit 224, the current sensing circuit 226, the central processing unit 227, a pulse width modulation (PWM) output circuit 227c, the RDC and peripheral circuitry 229 are provided on a control/gate board 228.

The central processing unit 227 includes an AC-DC converter 227a configured to sense a signal of the voltage sensing circuit 224 and an AC-DC converter 227b configured to sense a signal of the current sensing circuit 226. The central processing unit 227 further includes at least one first output end for outputting a predetermined signal S4 to the PWM output circuit 227c and at least one second output end for outputting other predetermined signals S1, S2, S3, and S5. The central processing unit 227 may further include a module (rotor position control module) configured to sense a position of the rotor 204 via the resolver 208 and control the position of the rotor 204. The rotor position control module may be used to control the position of the rotor when the field winding is in a charging mode.

The inverter 220 additionally includes a charge switch 212 disposed between the inverter 220 and the conversion circuit 210. The charge switch 212 includes a third switch T3 and a fourth switch T4 serially connected to two output ends of the conversion circuit 210. Each of the switches T3 and T4 may be operated in response to the control signal S2 of the central processing unit 227, and deliver a current that is induced at the field winding and rectified through the conversion circuit 210 to the battery 190 in an ON state. The charge switch 212 may maintain an OFF state during driving of the EV.

The above-described charge switch 212 may not be limited to the arrangement in the inverter 220, but may be disposed outside the inverter. Similarly, the conversion circuit 210 may not be limited to the arrangement outside the inverter 220, but may be formed integrally with the inverter 220. For example, the conversion circuit 210 may be integrated with the housing or casing of the inverter 220 together with the charge switch 212.

The conversion circuit 210 may be coupled to at least a portion of the resonance circuit. For example, the capacitor C2 of the resonance circuit may be disposed between one of two input ends of the bridge diode circuit constituting the conversion circuit 210 and one of two ends of the field winding. The capacitor C2 may be omitted depending on various configuration of the resonance circuit.

Both ends of the field winding wound on the rotor 204 of the driving motor 200 and two input ends of the conversion circuit 210 may be exposed to the outside of the driving motor 200 and may be connected to each other through the switching circuit 211. The switching circuit 211 may have a three-way switch structure for switching between a basic mode of performing a function inherent to the field winding and the charging mode of performing a function as a secondary coil. In the basic mode, both ends of the field winding may be connected to a device (e.g., the battery 190 or the like) that applies a predetermined power source to the field winding. The switching circuit 211 may be operable to selectively connect each of a first switch T1 and a second switch T2 which are respectively connected to the both ends of the field winding to either a first contact or a second contact according to the control signal S1 of the central processing unit 227. The first switch T1 and the second switch T2 may be referred to as 'mode change switches'.

More specifically, in an embodiment, the power module 221 includes six power elements Q5, Q6, Q7, Q8, Q9, and Q0. By the operation of these power elements, the AC power of the three-phase power source (u-phase, v-phase, w-phase)

may be applied to the driving motor 200. The power elements may include an insulated gate bipolar transistor (IGBT). Two input ends of the power module 221 are connected to the battery 190 via a main relay 192. The main relay 192 is operated ON/OFF by the control signal S3 of the central processing unit 227.

The battery 190 may be a part of a battery system that supplies power to the driving motor of the EV. The battery 190 may be charged by a wireless power induced in the field winding by the external primary coil. The battery system may include a battery management system (BMS) for managing the battery 190 and the battery 190, and the BMS may be connected to a vehicle controller and/or the VA controller to communicate with each other.

The at least one current sensor 225 may be capable of measuring currents in three-phase wiring output from the power module 221. Also, one of the at least one current sensor 225 may measure a current delivered from the conversion circuit 210 to the battery 190.

Figure 6:
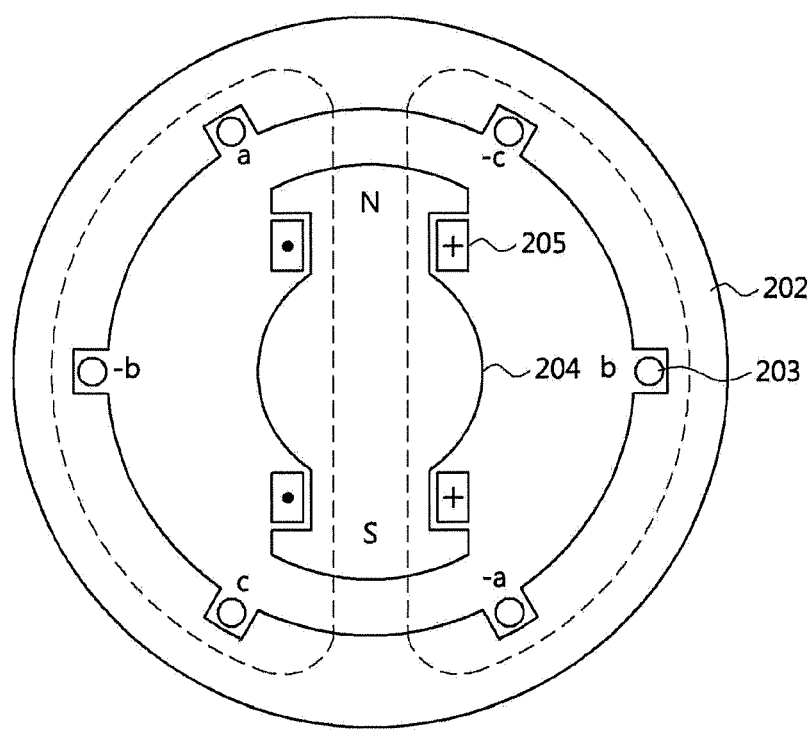
FIG. 6 is a schematic cross-sectional view of an embodiment of a driving motor employed in the WPT system of FIG. 5.

FIG. 6 is a schematic cross-sectional view of an embodiment of a driving motor employed in the WPT system of FIG. 5.

Referring to FIG. 6, the driving motor that can be employed in the WPT system according to an embodiment may be a field winding type motor. The driving motor may be an intelligent power module (IPM) motor. Using the IPM motor, the driving motor may be controlled through inverter control. At least a portion of the casing of the driving motor may be formed of a material through which magnetic fluxes can pass or formed such that magnetic fluxes can pass through the portion of the casing.

In an embodiment, the driving motor includes the stator 202, the at least one stator winding 203, the rotor 204, and the field winding 205.

Each of the three-phase input power source may be applied to first windings (a, −a), second windings (b, −b), and third windings (c, −c) of the at least one stator winding 203.

The rotor 204 has a circular center portion and a pair of protrusions protruding in a symmetrical shape at the center portion. Depending on the implementation, the protrusions more than two may be formed.

The field winding 205 is wound around each protrusion. In an embodiment, the field winding 205 serves as the secondary coil of the WPT system. For this, the center portion of the field winding 205 wound around the protrusions is configured to have an area equal to or greater than a predetermined area. For magnetic coupling with the primary coil external to the driving motor or with the primary coil embedded in the primary pad 152, the rotor 204 may have at least one hole (not shown) passing through the center portion of the field winding 205.

The at least one hole passing through the center portion of the field winding 205 and passing through the pair of protrusions of the rotor 204 functions to intensively link the field winding 205 to the magnetic flux generated in the primary coil.

Figure 7:
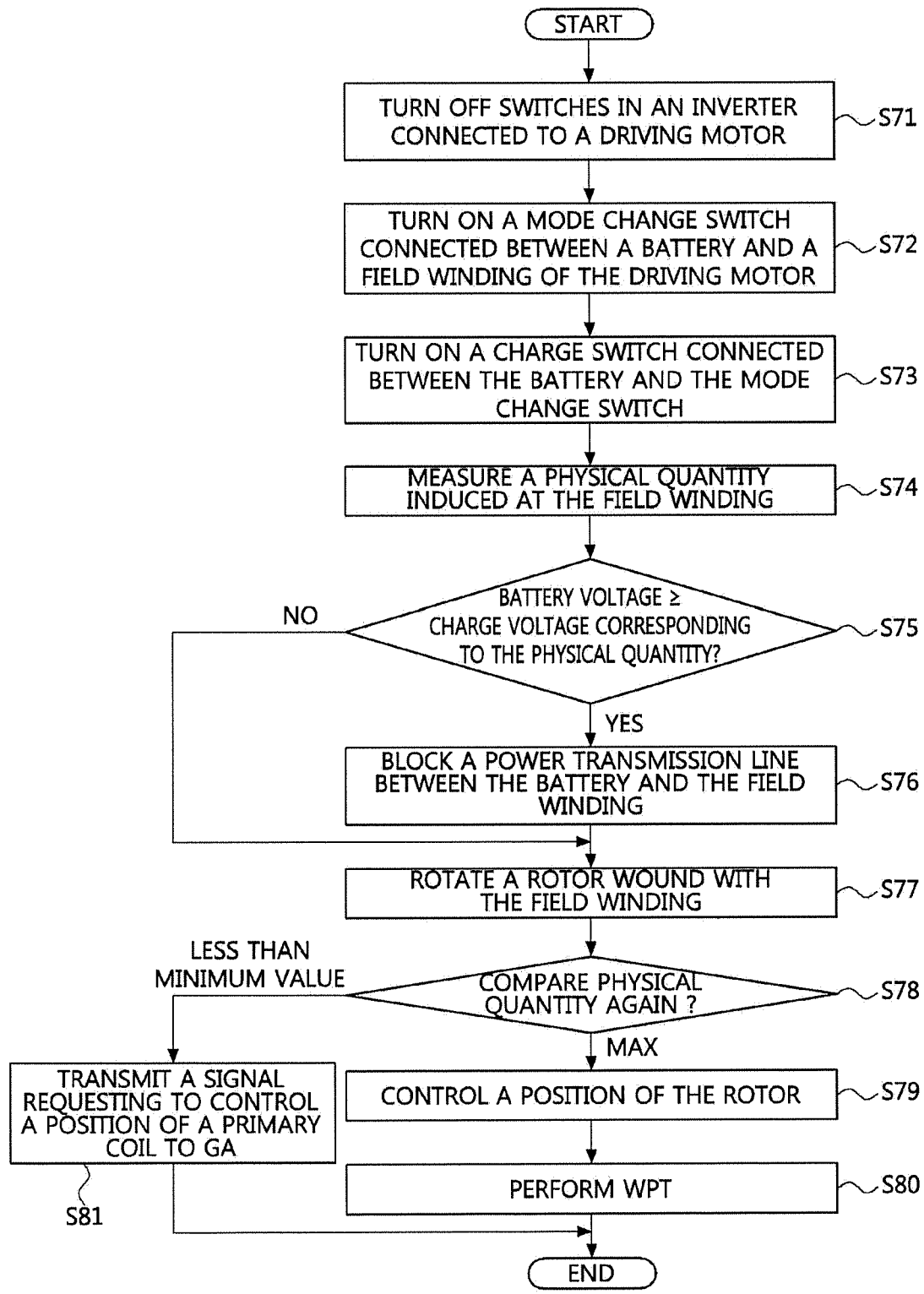
FIG. 7 is a illustrative flowchart for explaining a WPT method according to an embodiment of the present disclosure.

FIG. 7 is a flowchart explaining a WPT method according to another embodiment of the present disclosure.

Referring to FIG. 7, according to a WPT method according to an embodiment, the wireless power of the primary coil outside the vehicle is received using the field winding of the driving motor mounted on the EV.

For this, at S71, the switches in the inverter connected to the driving motor of the parked EV in a charging area are turned off.

At S72, the mode change switches T1 and T2 connected between the field winding of the driving motor and the battery mounted on the EV are turned on.

At S73, the charge switch connected between the battery and the mode change switch are turned on. At this stage, the battery charge is ready through the field winding, but the field winding and battery may still be electrically isolated yet. In such the isolated state, another battery, a dummy battery, or a dummy load may be connected to the field winding for the physical measurement in the next step.

At S74, a physical quantity induced at the field winding is measured in a battery charging preparation step for WTP or an initial stage of battery charging.

At S75. it is determined whether a battery voltage is equal to or higher than a charge voltage corresponding to the physical quantity.

If the battery voltage is equal to or higher than the charge voltage corresponding to the physical quantity, at S76, the power transmission line between the battery and the field winding is disconnected. The disconnection of the power transmission line may help to maintain the current isolated state.

If it is determined that the battery voltage is not less than the charge voltage in at S75, or after S76, the rotor of the field winding is rotated by a predetermined angle range at S77. In this step, the rotor may be rotated in a direction determined according to the position of the rotor sensed by the resolver, so that the field winding is arranged in parallel to the arrangement plane of the primary pad or the primary coil. In this case, each arrangement plane of the field windings arranged in a multi-layer structure may be arranged substantially parallel to the arrangement plane of the primary coil. Further, the field windings of the multi-layer structure may be arranged in a laminated structure on the arrangement plane of the primary coil.

At S78, the physical quantity due to the rotation of the rotor are compared again.

As a result of the comparison, if the physical quantity is equal to or greater than a minimum physical quantity for WPT, or if a Q factor of the magnetic coupling for WPT is maximum or the induced voltage is maximum, at S79 the position of the rotor is controlled to the position corresponding to the maximum (S79). At S80, the WPT is performed.

On the other hand, if it is determined at S78 that the physical quantity is less than the minimum physical quantity for WPT, at S81 the central processing unit transmits a signal requesting to control the position of the primary coil to the GA side, or the vehicle controller and/or the VA controller communicating with the central processing unit may receive the signal requesting to control the position of the primary coil from the central processing unit and transmit the signal to the GA side (S81).

Depending on the implementation, when the primary pad connected to the GA is installed to be directly controllable by the VA controller or the vehicle controller, the signal requesting to control the position of the primary coil may be replaced by a signal controlling the position of the primary coil, and the signal controlling the position of the primary coil may be directly transmitted to a control apparatus of an actuator connected to the primary pad or the GA controller performing the corresponding function.

While the embodiments of the present disclosure have been described in detail, it should be understood that various changes, substitutions and alterations may be made herein without departing from the scope of the disclosure.

What is claimed is:

1. A wireless power transfer (WPT) method for an electric vehicle (EV), the method comprising:
   a vehicle controller or a vehicle assembly (VA) controller connected to the vehicle controller performing communications, for charging of a battery of the EV, with a ground assembly (GA) controller of a charger connected to a primary coil or a primary pad located outside the EV; and
   connecting the battery to a field winding of a driving motor of the EV before starting the WPT,
   wherein the battery is charged by a power magnetically induced at the field winding from the primary coil.

2. The WPT method according to claim 1, wherein the connecting of the battery comprises turning on a first switch between the field winding of the driving motor and the inverter, and turning on a second switch between the field winding of the driving motor and the battery.

3. The WPT method according to claim 1, wherein the field winding comprises a first field winding facing the primary coil and a second field winding facing the primary coil with the first field winding interposed between the primary coil and the second field winding coil.

4. The WPT method according to claim 1, further comprising, after the connecting of the battery,
   sensing a voltage or a current by a magnetic field induced at the field winding;
   determining whether a physical quantity is equal to or greater than a first reference value, the physical quantity including or being based on the voltage or the current;
   rotating a rotor of the driving motor wound on which the field winding is wound within a predetermined angle range in response to a determination that the physical quantity is not equal to or greater than the first reference value; and
   determining a position where the physical quantity is largest within the predetermined angle range as a charging position of the rotor.

5. The WPT method according to claim 4, further comprising, after the determining of the position, transmitting a signal requesting to control a position of the primary coil to the GA controller controlling the primary coil when the physical quantity is not equal to or greater than the first reference value.

6. The WPT method according to claim 4, further comprising, after the determining of the position, transmitting a control signal for controlling a position of the primary coil to an externally-controllable actuator connected to the primary coil.

7. A vehicle assembly (VA) for wireless power transfer (WPT), comprising:
   a secondary coil magnetically coupled to a primary coil located outside an electric vehicle (EV);
   an impedance matching network (IMN) or a filter connected to the secondary coil;
   a rectifier connected to the IMN or the filter; and
   an impedance converter connected to the rectifier,
   wherein the secondary coil comprises a field winding of a driving motor of the EV.

8. The VA according to claim 7, further comprising:
   a mode change switch connected between the field winding and the IMN or the filter; and
   a charge switch disposed between a battery of the EV and the impedance converter.

9. The VA according to claim 8, further comprising a controller mounted on the EV,
   wherein the controller is connected to or includes at least one of a control board configured to control an inverter connected to the driving motor with three-phase wiring, a vehicle assembly (VA) controller, and a vehicle controller, and
   wherein the controller is configured to turn off switches in the inverter connected to the driving motor via the control board, and to control the mode change switch and the charge switch to connect the field winding to the battery.

10. The VA according to claim 9, wherein the controller changes a position or a phase angle of a rotor of the driving motor on which the field winding is wound based on a physical quantity, the physical quantity including or being based on a voltage or a current induced at the field winding by the primary coil.

11. The VA according to claim 10, wherein the field winding is regularly or symmetrically arranged in a lap winding structure only on a part of a surface of the rotor.

12. The VA according to claim 7, wherein a conversion circuit including the IMN or the filter, the rectifier, and the impedance converter is housed in a housing for accommodating an inverter connected to the driving motor through three-phase wiring and a control board configured to control the inverter.

13. An electric vehicle (EV) comprising:
   a driving motor;
   an inverter connected to the driving motor;
   a control board configured to control a plurality of switches of the inverter;
   a battery connected to a field winding of the driving motor; and
   a charge switch disposed between the field winding of the driving motor and the battery to allow or block current flow on the field winding,
   wherein a current induced at the field winding by a magnetic field from an external primary coil is charged to the battery when the charge switch is turned on.

14. The EV according to claim 13, further comprising a connector assembly connected to the charge switch and electrically coupled to a pair of electrodes on which a pair of ends of the field winding are exposed.

15. The EV according to claim 14, further comprising a secondary side conversion circuit arranged between the charge switch and the connector assembly.

16. The EV according to claim 13, wherein the control board includes a sensing circuit for detecting a secondary current or a secondary voltage induced at the field winding, and the control board is configured to output a control signal for blocking a power transmission line between the battery and the charge switch based on a current voltage of the battery and one of the secondary current and the secondary voltage.

17. The EV according to claim 13, wherein the control board is configured to control a position of the rotor sensed based on the secondary current or the secondary voltage.

18. The EV according to claim 13, wherein the driving motor is disposed below an engine compartment of the EV.

* * * * *